(12) United States Patent
Golding (10) Patent No.: US 11,003,935 B2
(45) Date of Patent: May 11, 2021

(54) OPTICAL CHARACTER RECOGNITION PARSING

(71) Applicant: Prosper Funding LLC, San Francisco, CA (US)

(72) Inventor: Paul Golding, San Francisco, CA (US)

(73) Assignee: Prosper Funding LLC, San Francisco, CA (US)

( * ) Notice: Subject to any disclaimer, the term of this patent is extended or adjusted under 35 U.S.C. 154(b) by 88 days.

(21) Appl. No.: 16/394,414

(22) Filed: Apr. 25, 2019

(65) Prior Publication Data

US 2020/0160051 A1 May 21, 2020

Related U.S. Application Data

(60) Provisional application No. 62/769,490, filed on Nov. 19, 2018.

(51) Int. Cl.

| | |
|---|---|
| *G06K 9/18* | (2006.01) |
| *G06K 9/00* | (2006.01) |
| *G06K 9/20* | (2006.01) |
| *G06T 7/73* | (2017.01) |
| *G06T 5/30* | (2006.01) |
| *G06T 3/60* | (2006.01) |
| *G06K 9/62* | (2006.01) |
| *G06T 7/60* | (2017.01) |
| *G06T 7/11* | (2017.01) |
| *G06T 7/13* | (2017.01) |

(52) U.S. Cl.
CPC ......... *G06K 9/186* (2013.01); *G06K 9/00463* (2013.01); *G06K 9/00469* (2013.01); *G06K 9/2054* (2013.01); *G06K 9/6215* (2013.01); *G06K 9/6232* (2013.01); *G06K 9/6253* (2013.01); *G06K 9/6261* (2013.01); *G06T 3/60* (2013.01); *G06T 5/30* (2013.01); *G06T 7/11* (2017.01); *G06T 7/13* (2017.01); *G06T 7/60* (2013.01); *G06T 7/73* (2017.01); *G06K 2209/01* (2013.01); *G06T 2207/30176* (2013.01)

(58) Field of Classification Search
CPC .................................................. G06K 9/00463
See application file for complete search history.

(56) References Cited

U.S. PATENT DOCUMENTS

| | | | | |
|---|---|---|---|---|
| 5,097,517 | A * | 3/1992 | Holt | G06K 9/00 382/137 |
| 2008/0063277 | A1* | 3/2008 | Vincent | G06K 9/00463 382/182 |
| 2015/0278940 | A1* | 10/2015 | Jasko | G06Q 10/10 705/35 |

\* cited by examiner

*Primary Examiner* — King Y Poon
*Assistant Examiner* — Michael Burleson
(74) *Attorney, Agent, or Firm* — Ferguson Braswell Fraser Kubasta PC (57) ABSTRACT

A method for image processing is disclosed. The method includes: obtaining an image associated with a check; obtaining target strings associated with a payor of the check and based on a user input; obtaining extracted strings by applying multiple optical character recognition (OCR) processes with different segmentation modes to the image; identifying, using an expandable and sliding window (ESW), matches between the plurality of target strings and the plurality of extracted strings; and selecting a winning match from the plurality of matches.

16 Claims, 6 Drawing Sheets

OPTICAL CHARACTER RECOGNITION PARSING

CROSS-REFERENCE TO RELATED APPLICATIONS

This application claims priority under 35 U.S.C. § 119(e) to U.S. Provisional Patent Application No. 62/769,490, which filed on Nov. 19, 2018. U.S. Provisional Patent Application No. 62/769,490 is hereby incorporated by reference in its entirety.

This application is related to U.S. patent application Ser. No. 16/295,740, which filed on Mar. 7, 2019. U.S. patent application Ser. No. 16/295,740 is hereby incorporated by reference in its entirety.

BACKGROUND

An optical character recognition (OCR) process is executed upon an image to extract strings (i.e., text characters) from the image. An OCR process may operate in one of multiple segmentation modes. Different segmentation modes correspond to different presumptions regarding the textural structure of the image. For example, one segmentation mode may presume the image is a single column of text, while a different segmentation mode may presume the image has multiple columns of text.

OCR is frequently performed on images of paper checks. However, these images likely contains noise, distortions, and/or other OCR uncertainties. Moreover, a check does not possess a regular text structure that is consistent across all checks. Accordingly, no single segmentation mode is guaranteed to produce the most accurate results (i.e., the most accurate extracted strings) especially for unconstrained images containing information besides just the check. Regardless, it is still common to perform OCR on images of checks.

SUMMARY

In general, in one aspect, one or more embodiments relate to a method for image processing. The method comprises: obtaining an image associated with a check; obtaining a plurality of target strings associated with a payor of the check and based on a user input; obtaining a plurality of extracted strings by applying a plurality of optical character recognition (OCR) processes with different segmentation modes to the image; identifying, using an expandable and sliding window (ESW), a plurality of matches between the plurality of target strings and the plurality of extracted strings; and selecting a winning match from the plurality of matches.

In general, in one aspect, one or more embodiments relate to a system for image processing. The system comprises: a repository storing an image associated with a check; a target string engine that generates a plurality of target strings associated with a payor of the check and based on a user input; an optical character recognition (OCR) engine that obtains a plurality of extracted strings by applying a plurality of OCR processes with different segmentation modes to the image; a matching engine that identifies, using an expandable and sliding window (ESW), a plurality of matches between the plurality of target strings and the plurality of extracted strings; and a verification engine that selects a winning match from the plurality of matches.

In general, in one aspect, one or more embodiments relate to a non-transitory computer readable medium (CRM) storing instructions for image processing. The instructions, when executed by a computer processor, comprising functionality for: obtaining an image associated with a check; obtaining a plurality of target strings associated with a payor of the check and based on a user input; obtaining a plurality of extracted strings by applying a plurality of optical character recognition (OCR) processes with different segmentation modes to the image; identifying, using an expandable and sliding window (ESW), a plurality of matches between the plurality of target strings and the plurality of extracted strings; and selecting a winning match from the plurality of matches.

Other aspects of the embodiments will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments are directed towards obtaining user input regarding a check, obtaining one or more target strings based on the user input, and then extracting multiple strings from an image of the check using different segmentation modes of an OCR process. Matches between the extracted strings and the target strings are identified using an expandable and sliding window (ESW). The winning match (e.g., the match with the highest score) may be used to verify the user who provided the user input is the owner of the check. Accordingly, one or more embodiments are directed towards improvements in the technical fields of at least user authentication and image processing.

Figure 1:
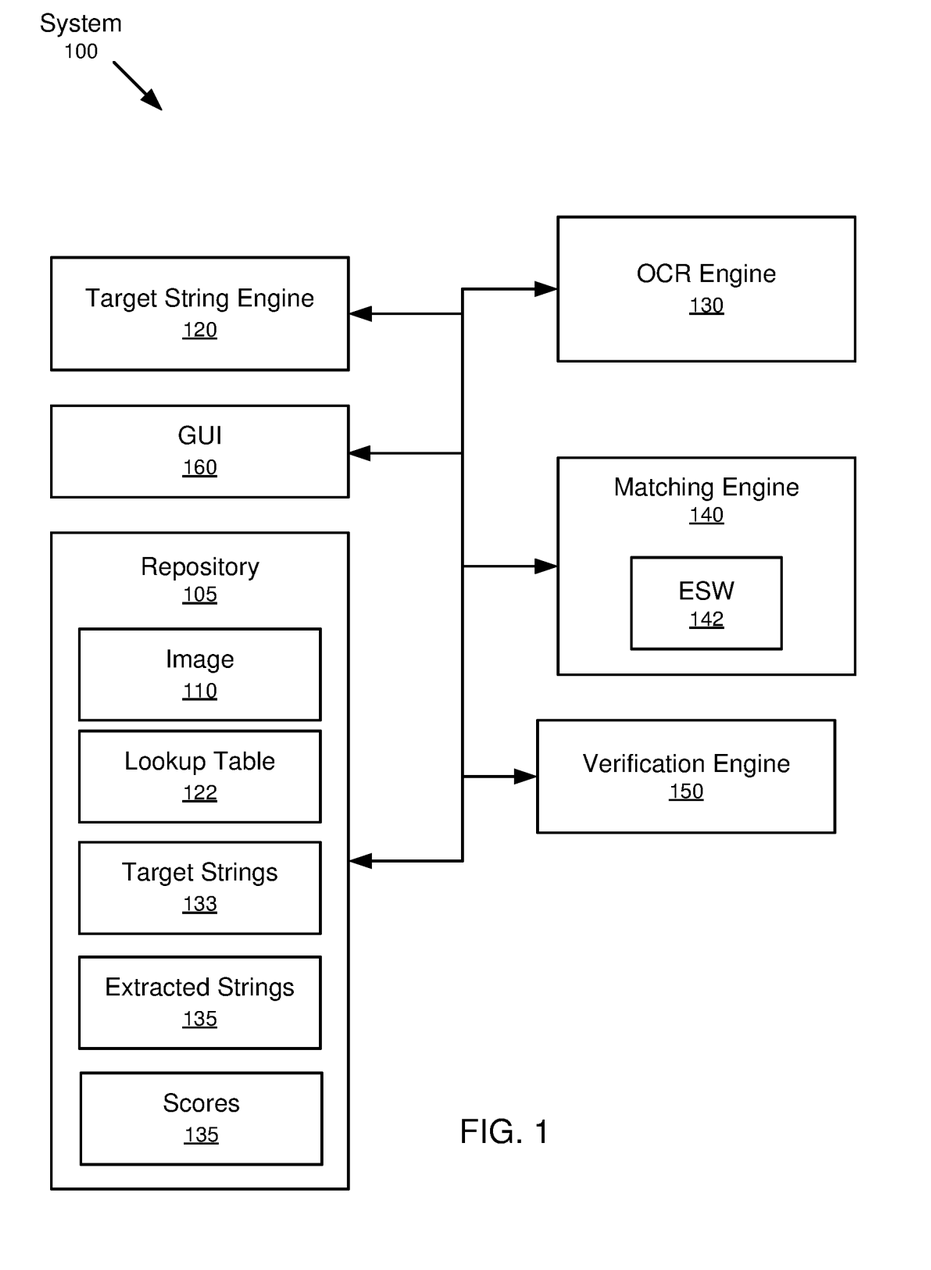
FIG. 1 shows a system in accordance with one or more embodiments of the invention.

FIG. 1 shows a system (100) in accordance with one or more embodiments. The system (100) has multiple components including a repository (105), a target string engine (120), an OCR engine (130), a matching engine (140), a verification engine (150), and a graphical user interface (GUI) (160). Each of these components (105, 120, 130, 140, 150, 160) may execute on the same computing device (e.g., server, personal computer (PC), laptop, smart phone, tablet PC, etc.) or may execute on different computing devices connected by a network (e.g., the Internet) having wired and/or wireless segments. Moreover, each component (105, 120, 130, 140, 150, 160) may be implemented in hardware (i.e., circuitry), in software, or in any combination of hardware and software.

In one or more embodiments, the repository (105) corresponds to any type of database, any type of memory (e.g., main memory, cache memory, etc.), and/or any type of permanent storage device (e.g., hard drive, flash drive, tape, etc.). Moreover, the repository (105) may correspond to multiple storage devices located at the same location or at different locations.

In one or more embodiments, the repository stores an image (110). The image (110) may have been acquired by a camera of a mobile device (e.g., smart phone, tablet PC, etc.). The image (110) may have been obtained over a computer network. In one or more embodiments, the image (110) includes a check with multiple fields (e.g., payor name, payor address, fraction code, check number, etc.). Some image processing (e.g., cropping, rotation, deskewing, scaling, etc.) may be performed on the image (110) such that noise is reduced, distortion is reduced, the check is horizontal or almost horizontal within the image (110), and/or the check is the only item within the image (110).

In one or more embodiments of the invention, the GUI (160) includes one or more GUI widgets (e.g., text boxes, drop down boxes, buttons, radio buttons, etc.). The GUI (160) is configured to obtain user input via one or more of the GUI widgets. The user input may specify one or more of the payor's name, payor's address, fraction code, check number, etc. associated with the check in the image (110). The user input may correspond to a single string (e.g., "first name+middle name+last name") or multiple strings (e.g., "first name", "middle name", "last name"). When the user input is initially obtained, it has not yet been verified whether the user input actually corresponds to what is printed on the check in the image (110). As an example, a user applying for a personal loan might send an image of a check to indicate proof of banking details alongside entering some of the information, such as applicant's name, in the aforementioned GUI.

In one or more embodiments of the invention, the user input may specify a different, but valid, payor name from the payor name printed on the check in the image (110). This might occur if the payor goes by a nickname, or because the payor has a joint checking account with a partner or spouse, and thus the partner's name or spouse's name is also printed on the check in the image (110). For example, the payor's name might be "James Bond". However, "James and Sarah Bond" may be printed on check in the image (110) or "Jim and Sarah Bond".

In one or more embodiments of the invention, the target string engine (120) is configured to generate one or more target strings (133) based on the user input. The target strings (133) may be generated by converting the user input according to target string templates (e.g., "First Last", "First Middle_Initial Last", "First_nickname Last", etc.) learned by observing naming patterns over a large body of labeled checks. In one or more embodiments, generating the target strings (133) may include accessing a lookup table (122) that inputs a string (e.g., a first name) and outputs interchangeable strings (e.g., nicknames). For example, if the user input is "Rob Edward Smith", possible target strings (133) include "R. Smith", "Robert Smith", "Bobby Smith", "Bob Smith", "Rob Ed. Smith", etc. In one or more embodiments, the user input, without any modifications, is also considered to be one of the target strings (133).

In one or more embodiments, the OCR engine (130) is configured to generate extracted strings (135) by executing one or more OCR processes on the image (110). The extracted strings (135) may correspond to one or more of the payor name, payor address, fraction code, check number, etc. printed on the check in the image (110). Each OCR process may operate according to a different segmentation mode, and each segmentation mode corresponds to different presumptions regarding the textural structure of the image (110). For example, one segmentation mode may presume the image (110) is a single column of text, while a different segmentation mode may presume the image (110) has multiple columns of text. Since a check does not possess a regular text structure that is consistent across all checks, no single segmentation mode is guaranteed to produce the most accurate extracted strings (135).

In one or more embodiments of the invention, the matching engine (140) is configured to identify matches between the target strings (133) and the extracted strings (135). Identifying matches may include executing a fuzzy text-matching technique that is tolerant of misaligned text boundaries and tolerant of missing or incorrect characters in the extracted strings (135). The matches may be assigned scores (135) reflecting the quality of the match.

In one or more embodiments, the matching engine (140) includes an expandable and sliding window (ESW) (142) for use in identifying matches. The ESW (142) may correspond to a grouping of consecutive characters (in an extracted string) selected for comparing/scoring with one of the target strings (133). For example, if the ESW (142) is of size N, the ESW (142) groups N consecutive characters of the extracted string for comparing/scoring with one of the target strings (133). The ESW (142) may be increased in size (e.g., from N to N+1, N+1 to N+2, etc.). Additionally or alternatively, the ESW (142) may slide along the extracted string, effectively changing which set of consecutive characters in the extracted string are being grouped for comparing/scoring with one of the target strings (133). Additional details regarding operation of the matching engine (140), the use of the ESW (142), and the calculation of the scores (135) are discussed below.

In one or more embodiments of the invention, the verification engine (150) is configured to verify the user input. In one or more embodiments, verification is the process of confirming (to an acceptable degree of confidence as identified by business risk rules) that the payor name provided via user input is the same as the name on the check. The verification process may include identifying the winning match (e.g., the match with the highest score of scores (135)). If this highest score satisfies (e.g., equals or exceeds) a threshold, the user input (and the user that provided the user input) is deemed to be verified. Additionally or alternatively, the highest score may be reported to another application executing one or more additional verification processes.

Although the system (100) in FIG. 1 is shown as having six components (105, 120, 130, 140, 150, 160), in other embodiments, the system (100) may have additional components and/or some of the shown components (105, 120, 130, 140, 150, 160) may be merged into a single component.

Figure 2:
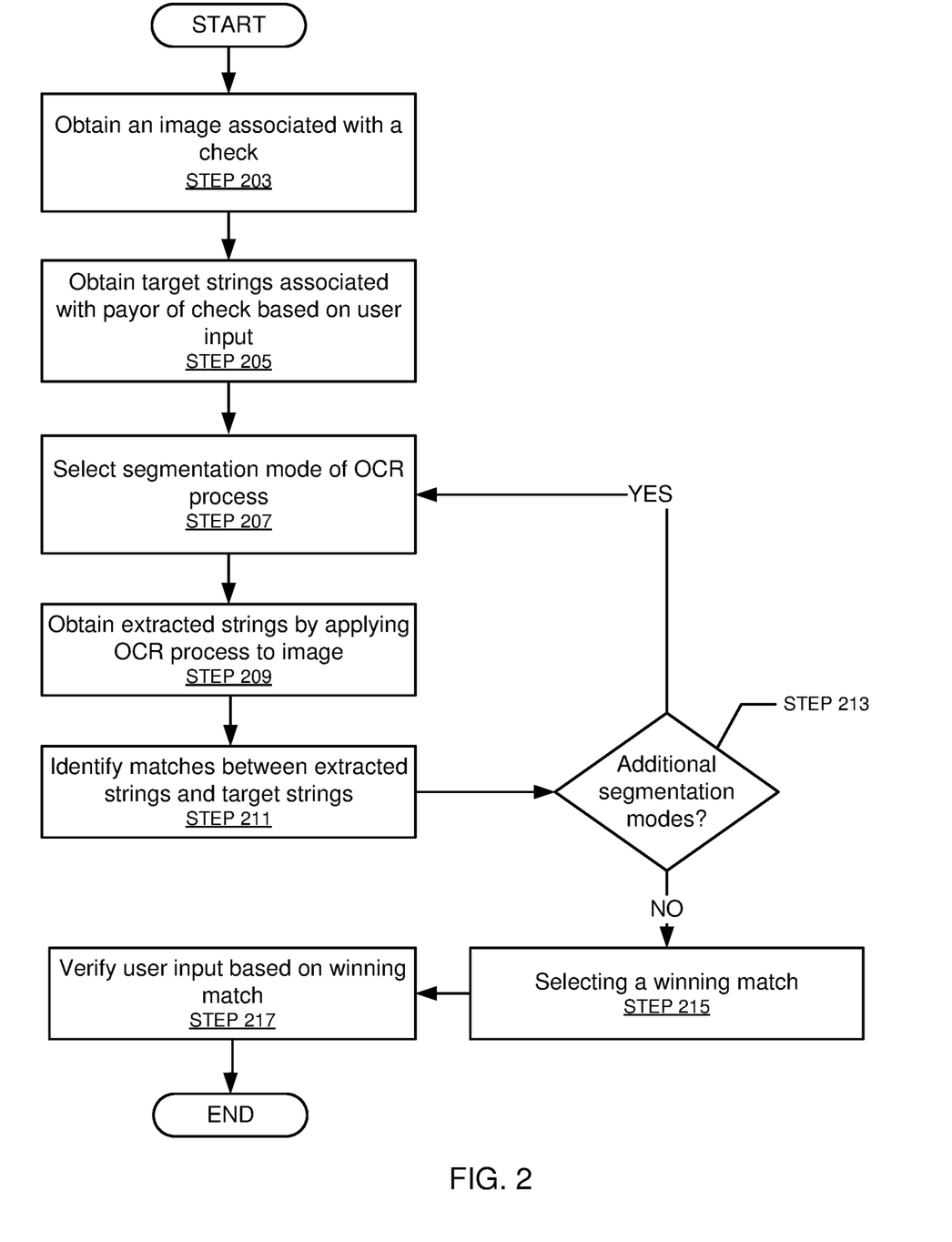
FIGS. 2-4 show flowcharts in accordance with one or more embodiments of the invention.

FIG. 2 depicts a flowchart in accordance with one or more embodiments. One or more steps of the flowchart may be performed by one or more components of system (100), discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

In STEP 203, an image is obtained. The image may be obtained from a camera attached to a mobile device and/or downloaded over the Internet. The image includes a paper check with one or more of the payor's name, payor's address, fraction code, check number printed on the check. Image processing may be performed on the image to reduce noise, reduce distortion, rotate the check to be horizontal (or almost horizontal) within the image, and/or crop items other than the check from the image.

In STEP 205, target strings associated with the payor of the check are obtained. Specifically, user input specifying one or more of the payor' s name, payor's address, fraction code, check number, etc. associated with the check in the image may first be obtained via a GUI. The user input may correspond to a single string (e.g., "first name+middle name+last name") or multiple strings (e.g., "first name", "middle name", "last name"). When the user input is initially obtained, it has not yet been verified whether the user input actually corresponds to what is printed on the check in the image. The target strings may be generated by converting the user input accordingly to target string templates (e.g., "First Last", "First Middle_Initial Last", "First_nickname Last", etc.). In one or more embodiments, generating the target strings may include accessing a lookup table that inputs a string (e.g., a first name) and outputs interchangeable strings (e.g., nicknames). For example, if the user input is "Jimmy Stewart", possible target strings include "James Stewart", "Jim Stewart", "J. Stewart", etc. In one or more embodiments, the user input without any modifications (e.g., "Jimmy Stewart") is also considered to be one of the target strings.

In STEP 207, the segmentation mode of an OCR process is selected. An OCR process may operate according to one of various segmentation modes, and each segmentation mode corresponds to different presumptions regarding the textural structure of the image. For example, one segmentation mode may presume the image is a single column of text, while a different segmentation mode may presume the image has multiple columns of text. If this is the first execution of STEP 207, a segmentation mode may be selected at random. If this is not the first execution of STEP 207, a segmentation mode that has not yet been selected is chosen.

In STEP 209, extracted strings are obtained. The extracted strings may be generated by applying the OCR process to the image. The extracted strings may correspond to one or more of the payor name, payor address, fraction code, check number, etc. printed on the check in the image. In one or more embodiments, the OCR process also returns locations (e.g., coordinates) of the extracted strings within the image. For example, the OCR process may return the starting coordinates of each extracted string within the image.

In STEP 211, matches between the targets strings and the extracted strings are identified. Identifying matches may include executing a fuzzy text-matching technique that is tolerant of misaligned text boundaries and tolerant of missing or incorrect characters in the extracted strings. Moreover, identifying matches may also include calculating scores using the ESW. Additional details regarding identifying matches are discussed below in reference to FIG. 3.

In STEP 213, it is determined whether at least one segmentation mode remains that has not yet been selected. When it is determined that there exists at least one segmentation mode that has not yet been selected, the process returns to STEP 207. When it is determined that all the segmentation modes have been selected or a sufficient number have been selected, the process proceeds to STEP 215. As discussed above, since a check does not possess a regular text structure that is consistent across all checks, no single segmentation mode is guaranteed to produce the most accurate extracted strings in STEP 209. However, by executing the OCR process multiple times with different segmentations modes, it is more likely that one iteration of STEP 209 will generate accurate extracted strings.

In STEP 215, a winning match is selected. The winning match may correspond to the match with the highest calculated score. In STEP 217, the user input may be verified based on the winning match (e.g., the score of the winning match must satisfy a threshold).

Although the description of FIG. 2 focuses heavily on target strings and extracted strings corresponding to the payor' s name on the check in the image, the process in FIG. 2 may be also be executed for strings corresponding to other content printed on the check in the image.

Figure 3:
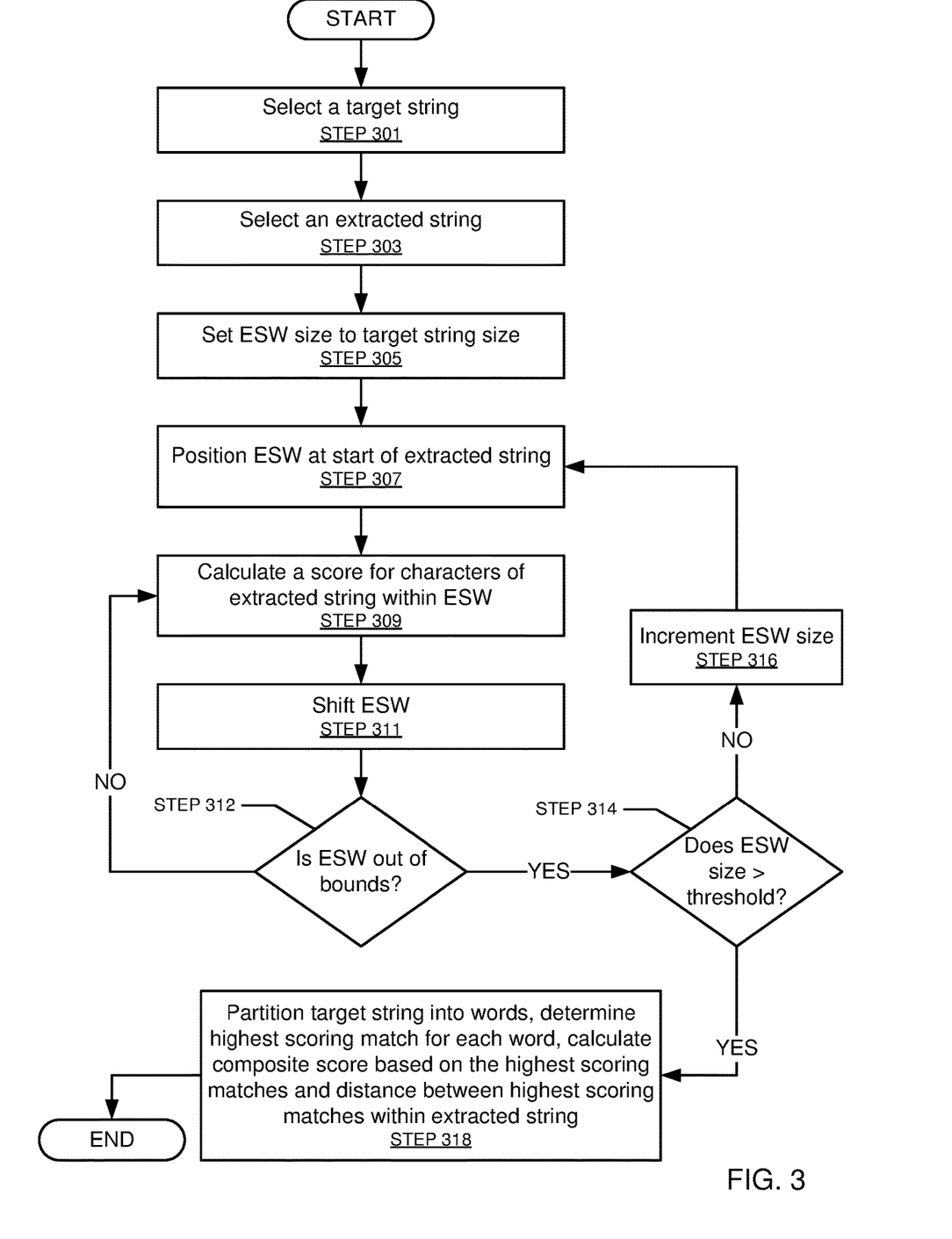

FIG. 3 depicts a flowchart in accordance with one or more embodiments of the invention. One or more steps of the flowchart may be performed by one or more components of system (100), discussed above in reference to FIG. 1. One or more of the steps in FIG. 3 may be correspond to STEP 211, discussed above in reference to FIG. 2. In one or more embodiments, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Before executing the process depicted in FIG. 3, multiple target strings and multiple extracted strings have been obtained (discussed above in reference to STEP 205 and STEP 219). In STEP 301 and STEP 303, one of the target strings is selected and one of extracted strings is selected, respectively. The target string and the extracted string may have different lengths (i.e., the target string may have a different number of characters than the extracted string).

In STEP 305, the ESW size is set to the size of the selected target string. In other words, if the target string is k characters in size, the ESW size is set to k characters. A blank space may be considered a character. For example, the target string "Mike Smith" has a size of 10.

In STEP 307, the ESW is positioned at the start of the selected extracted string. In other words, if the ESW size is N, following execution of STEP 307 the ESW is now grouping the first N characters of the selected extracted string.

In STEP 309, the characters of the extracted string within the ESW are compared with the target string and a score for these characters is calculated. Additional details regarding calculation of the score are discussed below in reference to FIG. 4. In one or more embodiments, a match between the characters within the ESW and the selected target string is declared when the calculated score satisfies (e.g., equals or exceeds) a threshold. If the calculated score does not satisfy the threshold, no match is declared.

In STEP 311, the ESW is shifted to the right by one along the extracted string. Accordingly, if the ESW was previously grouping characters β through Φ of the extracted string, following STEP 311, the ESW is now grouping characters (β+1) through (Φ+1) of the extracted string.

In STEP 312 it is determined whether the ESW is out of bounds. In other words, it is determined whether the ESW extends beyond the extracted string. For example, if the ESW has a size of 3 and the starting position of the ESW is now the second last character in the extracted string, the ESW now extends beyond the extracted string. When it is determined that the ESW is not out of bounds, the process returns to STEP 309. When it is determined that the ESW is out of bounds, the process proceeds to STEP 314.

In STEP 314, it is determined whether the size of the ESW exceeds a threshold. For example, the threshold may equal the size of the selected target string+3 (or another other whole number). As another example, the threshold may equal the size of the target string×1.5 (or another positive value in excess of 1), rounded to the nearest natural number. When it is determined that the size of the ESW exceeds a threshold, the process proceeds to STEP 318. When it is determined that the size of the ESW does not exceed the threshold, the process proceeds to STEP 316.

In STEP 316, the size of the ESW is incremented. Accordingly, if the size of the ESW was N, following execution of STEP 316 the size of the ESW becomes N+1, and the process returns to STEP 307. Alternatively, each execution of STEP 316 may increase the size of the ESW by more than one.

In STEP 318, if the selected target string is composed of multiple words (e.g., a first name and a last name), the selected target string may be partitioned into its multiple words. This might be necessary because the name on the check contains a middle initial whereas the name submitted for verification does not. Or it might be necessary because of OCR artifacts that introduce spurious characters into the target string such that matching on the entire name will produce a low score over a reasonable window length (ESW). For each of the multiple words, STEPS 305-314 may be repeated while treating one of the multiple words as the target string. Once the highest scoring match (i.e., set of characters in the extracted string) for each of the words is determined, the distance between these matches may be determined so as to avoid the potential of matching individual words that are far apart in the target string and so unlikely to constitute the full name being sought (e.g. if, say, the surname appears later or elsewhere on the check or even as part of the bank name). A small distance (i.e., a distance that is less than a distance threshold) indicates the matches are geometrically close and thus are more likely to correspond to the target string that was partitioned. In contrast, if the distance equals or exceeds the distance threshold, it is likely the matches do not correspond to the target string that was partitioned.

Still referring to STEP 318, when the distance is small, a composite score is calculated based on the high score matches for the words and the distance. A match between the target string (before it was partitioned) and the selected extracted string is declared when composite score satisfies a threshold. The composite score may be one of the scores (135), discussed above in reference to FIG. 1. One method of calculating the composite score is calculate the averages of the individual scores and compare to a threshold. Additionally, we might weight the individual scores when averaging by taking into account the prior probabilities of the words in terms of how likely a word, or something similar, is to appear in the target string to begin with. For words more likely to appear, such as common nicknames (versus rare ones) then we should add a lower weight since the chances of misidentifying the word are higher for more common words. For example, the word "Bob" might have a lower weighting applied if there are a lot of expected occurrences of that word due to it being a common name, or words that are close to it like "Rob". In other words, the chances of confusing "Bob" with "Rob" are high and so we should apply a lower weighting to its score to represent that we are less confident in mismatches. Whereas the word "Petulia" is relatively rare in terms of word frequencies and so we might be more relaxed with its score and apply a higher weighting to say a mismatch like "Petunio" (two wrong characters) because the chances of finding a similar name that would fit this mismatch, or thereabouts, are relatively low.

Although the description of FIG. 3 focuses heavily on target strings and extracted strings corresponding to the payor's name on the check in the image, the process in FIG. 3 may be also be executed for strings corresponding to other content printed on the check in the image. Moreover, the process depicted in FIG. 3 may be repeated until every extracted string is searched for matches with every target string.

Figure 4:
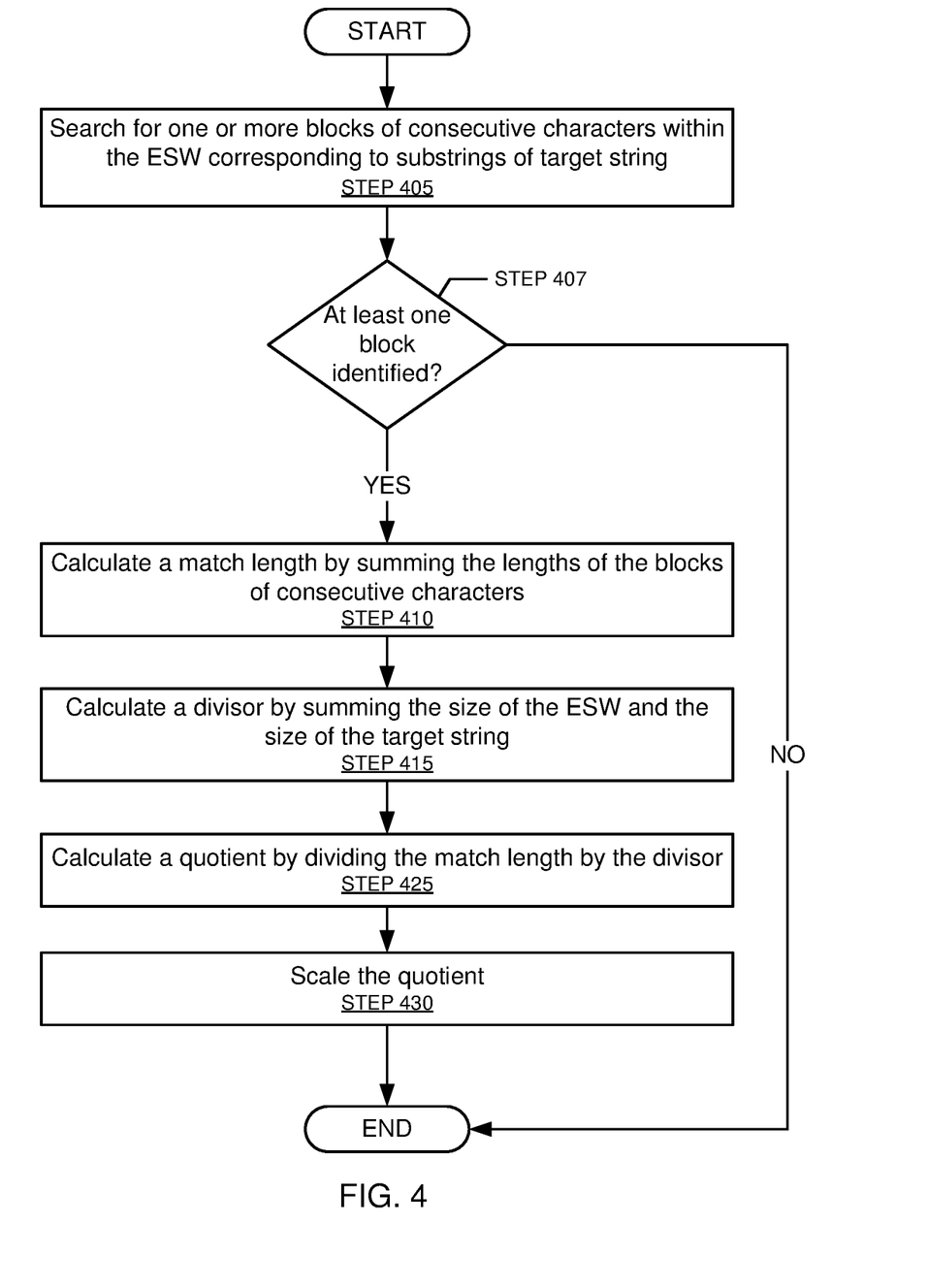

FIG. 4 depicts a flowchart in accordance with one or more embodiments of the invention. One or more steps of the flowchart may be performed by one or more components of system (100), discussed above in reference to FIG. 1. One or more of the steps in FIG. 4 may be correspond to Step 309, discussed above in reference to FIG. 3. In one or more embodiments, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Prior to executing the process depicted in FIG. 4, a target string and an extracted string have been selected, and the ESW is grouping consecutive characters of the extracted string.

In STEP 405, a search is conducted for one or more blocks of consecutive characters (i.e., 2 or more characters) within the ESW that correspond to substrings of the target string. For example, if the target string is "John", then a search is conducted for the following blocks: "Jo", "Joh", "ohn" "hn", and "John". If the characters within the ESW are "Jo*hn", then the search returns the blocks "Jo" and "hn". If the characters within the ESW are "J*ohn", then the search returns the block "ohn". If the characters within the ESW are "*John*", then the search returns the block "John". In one or more embodiments, if multiple blocks overlap, the search returns the largest block. In one or more embodiments, searching includes stepping through the characters of the ESW and the characters of the target string without backtracking through either the ESW or the target string. As a result, if the characters within the ESW are "hnJo**", then the search only returns the block "hn". Although both "hn" and "Jo" are substrings of the target string, "Jo" is never found after "hn" within the target string. In one or more embodiments, searching does not find strings out of order. If "ohn" comes before "joh", the searching will only match "ohn" or "joh" and not on "john".

In STEP 407, it is determined whether at least one block was returned by the search. When it is determined that at least one block is returned, the process proceeds to STEP 410. When it is determined that no block has been returned, the process may end and report no matches identified.

In STEP 410, a match length is calculated. The match length may be calculated by summing the lengths of individual blocks returned by the search. For example, if the search returned the blocks of "Jo" and "hn", then the match length would be 2+2=4. If the search returns a single block, the match length is set to the length of the single block. For example, if the single block "ohn" is returned by the search, the match length is set to 3.

In STEP 415, a divisor is calculated. The divisor may be calculated by summing the size of the ESW and the size of the target string. In STEP 420, a quotient is calculated by dividing the match length by the divisor. The quotient may correspond to the score. Additionally or alternatively, the quotient may be scaled by a constant (e.g., 2×quotient) (STEP 430) and the scaled quotient corresponds to the score.

Although the description of FIG. 4 focuses heavily on target strings and extracted strings corresponding to the payor's name on the check in the image, the process in FIG. 4 may be also be executed for strings corresponding to other content printed on the check in the image.

Figure 5:
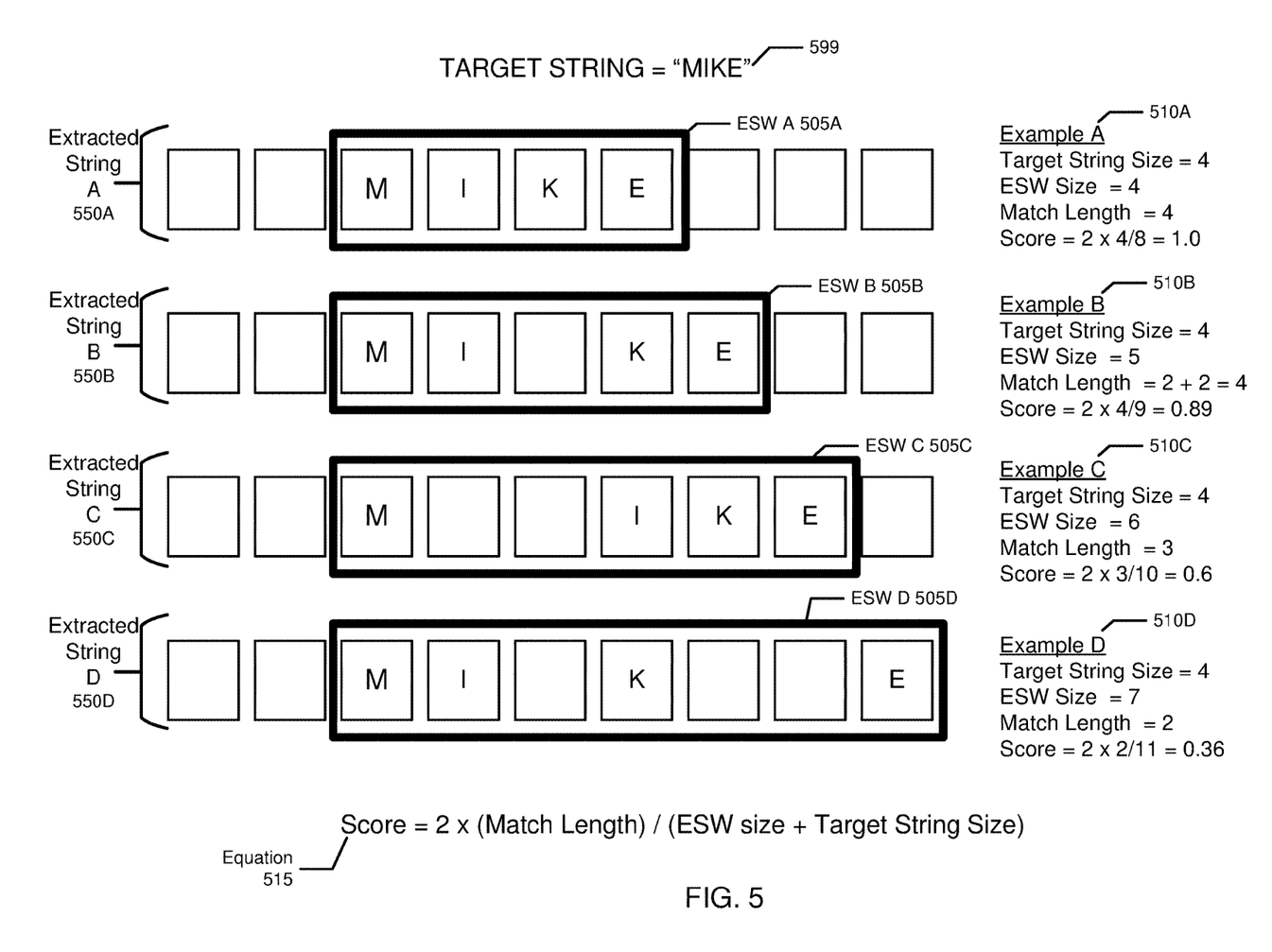
FIG. 5 shows an example in accordance with one or more embodiments of the invention.

FIG. 5 shows four examples in accordance with one or more embodiments of the invention: example A (510A), example B (510B), example C (510C), example D (510D). Each of the examples (510A-510D) corresponds to a different extracted string (i.e., extracted string A (550A), extracted string B (550B), extracted string C (550C), extracted string D (550D)). Moreover, each of the examples (510A-510D) involves a different sized ESW (i.e., ESW A (505A), ESW B (505B), ESW C (505C), ESW D (505D)). The examples (510A-510D) correspond primarily to the score calculation described in FIG. 4.

As shown in FIG. 5, each ESW (505A-505D) groups a set of consecutive characters within one of the extracted strings (550A-550D). Moreover, the characters in each ESW (505A-505D) are compared with the target string "MIKE" (599) and scored using equation (515).

In example A (510A), searching the characters within ESW A (505A) based on the target string (599) returns the single block "MIKE", which is a substring of the target string (599). As there is only one block, the match length is set to the size of the one block (i.e., match length=4). As the ESW has a size of 4 and the target string (599) has a size of 4, the score is calculated as 1.0 using the equation (515).

In example B (510B), searching the characters within ESW B (505B) based on the target string (599) returns two blocks: "MI" and "KE", which are both substrings of the target string (599). The match length may be calculated by summing the lengths of the two blocks (i.e., match length=2+2=4). As the ESW has a size of 5 and the target string (599) has a size of 4, the score is calculated as 0.89 using the equation (515).

In example C (510C), searching the characters within ESW C (505C) based on the target string (599) returns the single block "IKE", which is a substring of the target string (599). As there is only one block, the match length is set to the size of the one block (i.e., match length=3). As the ESW has a size of 6 and the target string (599) has a size of 4, the score is calculated as 0.6 using the equation (515).

In example D (510D), searching the characters within ESW D (505D) based on the target string (599) returns the single block "MI", which is a substring of the target string (599). As there is only one block, the match length is set to the size of the one block (i.e., match length=2). As the ESW has a size of 7 and the target string (599) has a size of 4, the score is calculated as 0.36 using the equation (515).

While the various steps in the flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 6A:
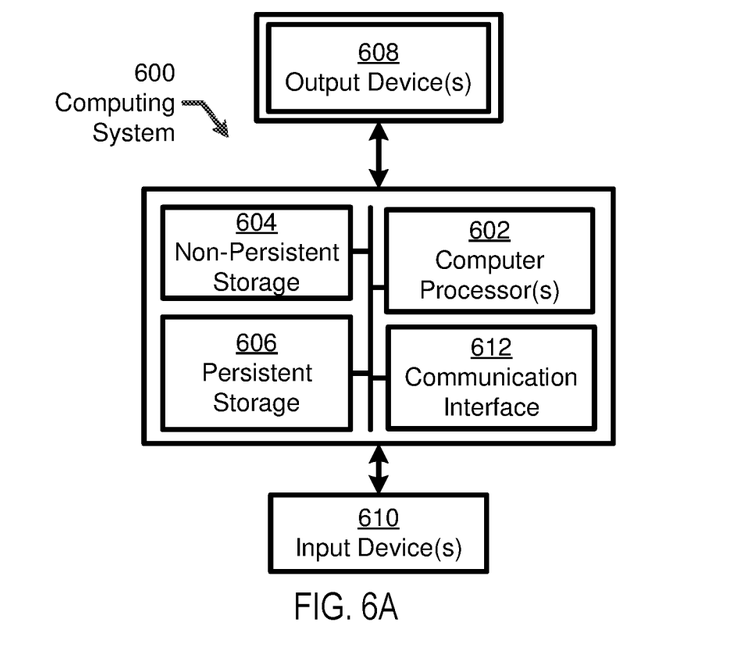
FIG. 6A and FIG. 6B show a computer system in accordance with one or more embodiments of the invention.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
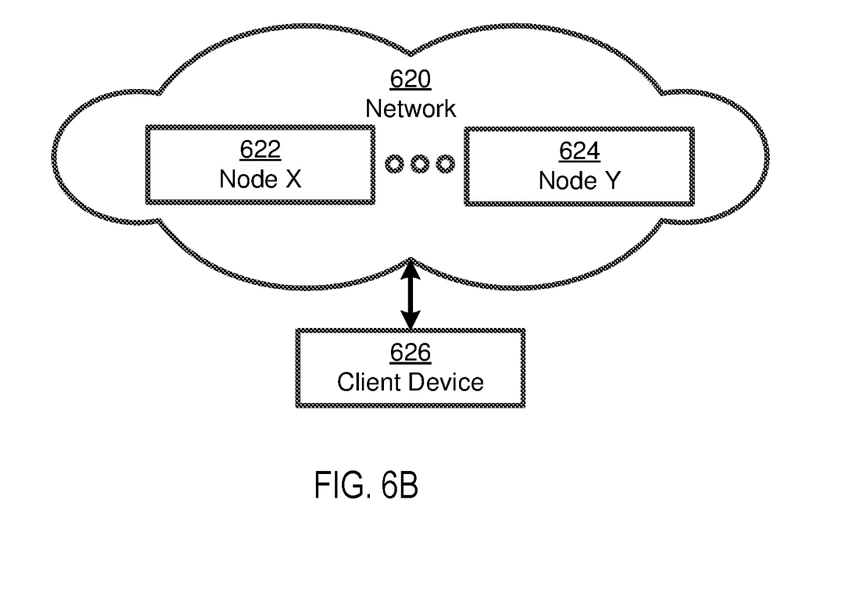

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIG. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A >B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
obtaining an image associated with a check;
obtaining a plurality of target strings associated with a payor of the check and based on a user input;
obtaining a plurality of extracted strings by applying a plurality of optical character recognition (OCR) processes with different segmentation modes to the image;
identifying, using an expandable and sliding window (ESW), a plurality of matches between the plurality of target strings and the plurality of extracted strings, wherein identifying the plurality of matches comprises:
selecting a target string of the plurality of target strings,
selecting an extracted string of the plurality of extracted strings,
calculating, based on the target string, a first score for a first plurality of characters of the extracted string within the ESW,
incrementing a size of the ESW, and
calculating, after increasing the size of the ESW and based on the target string, a second score for a second plurality of characters of the extracted string within the ESW; and
selecting a winning match from the plurality of matches.

2. The method of claim 1, further comprising:
verifying the user input based on a score of the winning match.

3. The method of claim 1, further comprising:
obtaining the user input specifying a nickname and a last name of the payor;
obtaining a first name based on the nickname; and
generating at least one of the plurality of target strings based on the first name and the last name.

4. The method of claim 1, wherein calculating the first score comprises:
identifying, within the first plurality of characters, a block of consecutive characters corresponding to a substring of the target string;
setting a match length to the length of the block;
calculating a divisor by summing the size of the ESW and a size of the target string; and
calculating a quotient by dividing the match length by the divisor,
wherein the first score comprises a scaled version of the quotient.

5. The method of claim 1, wherein calculating the second score comprises:
identifying, within the second plurality of characters, a plurality of blocks of consecutive characters corresponding to a plurality of substrings of the target string, wherein the plurality of blocks comprises a plurality of lengths;
calculating a match length by summing the plurality of lengths;
calculating a divisor by summing of the size of the ESW and a size of the target string; and
calculating a quotient by dividing of the match length by the divisor,
wherein the second score comprises a scaled version of the quotient.

6. The method of claim 1, further comprising:
setting, before calculating the first score, the size of the ESW to equal the size of the target string.

7. The method of claim 1, further comprising:
partitioning the target string into a first word and a second word;
calculating, based on the first word, a third score for a third plurality of characters of the extracted string within the ESW;
calculating, based on the second word, a fourth score for a fourth plurality of characters of the extracted string within the ESW;
determining a distance between the third plurality of characters and the fourth plurality of characters within the extracted string;
comparing the distance with a distance threshold; and
calculating, in response to the distance being less than the distance threshold, a composite score based on the third score and the fourth score.

8. A system for image processing, comprising:
a repository storing an image associated with a check;
a target string engine that generates a plurality of target strings associated with a payor of the check and based on a user input;
an optical character recognition (OCR) engine that obtains a plurality of extracted strings by applying a plurality of OCR processes with different segmentation modes to the image;
a matching engine that identifies, using an expandable and sliding window (ESW), a plurality of matches between the plurality of target strings and the plurality of extracted strings wherein to identify the plurality of matches, the matching engine:
selects a target string of the plurality of target strings,
selects an extracted string of the plurality of extracted strings,
calculates, based on the target string, a first score for a first plurality of characters of the extracted string within the ESW,
increments a size of the ESW, and
calculates, after increasing the size of the ESW and based on the target string, a second score for a second plurality of characters of the extracted string within the ESW; and
a verification engine that selects a winning match from the plurality of matches.

9. The system of claim 8, comprising:
a graphical user interface (GUI) comprising at least one widget that obtains the user input,
wherein the verification engine also verifies the user input based on a score of the winning match.

10. The system of claim 8, wherein calculating the first score comprises:
identifying, within the first plurality of characters, a block of consecutive characters corresponding to a substring of the target string;
setting a match length to the length of the block;
calculating a divisor by summing the size of the ESW and a size of the target string; and
calculating a quotient by dividing the match length by the divisor,
wherein the first score comprises a scaled version of the quotient.

11. The system of claim 8, wherein calculating the second score comprises:
identifying, within the second plurality of characters, a plurality of blocks of consecutive characters corresponding to a plurality of substrings of the target string, wherein the plurality of blocks comprises a plurality of lengths;

calculating a match length by summing the plurality of lengths;

calculating a divisor by summing of the size of the ESW and a size of the target string; and calculating a quotient by dividing of the match length by the divisor, wherein the second score comprises a scaled version of the quotient.

12. The system of claim 8, wherein the matching engine also:

partitions the target string into a first word and a second word;

calculates, based on the first word, a third score for a third plurality of characters of the extracted string within the ESW;

calculates, based on the second word, a fourth score for a fourth plurality of characters of the extracted string within the ESW;

determines a distance between the third plurality of characters and the fourth plurality of characters within the extracted string;

compares the distance with a distance threshold; and calculates, in response to the distance being less than the distance threshold, a composite score based on the third score and the fourth score.

13. A non-transitory computer readable medium (CRM) storing instructions for image processing, the instructions, when executed by a computer processor, comprising functionality for:

obtaining an image associated with a check;

obtaining a plurality of target strings associated with a payor of the check and based on a user input;

obtaining a plurality of extracted strings by applying a plurality of optical character recognition (OCR) processes with different segmentation modes to the image;

identifying, using an expandable and sliding window (ESW), a plurality of matches between the plurality of target strings and the plurality of extracted strings, wherein identifying the plurality of matches comprises:

selecting a target string of the plurality of target strings, selecting an extracted string of the plurality of extracted strings, calculating, based on the target string, a first score for a first plurality of characters of the extracted string within the ESW, increment a size of the ESW, and calculating, after increasing the size of the ESW and based on the target string, a second score for a second plurality of characters of the extracted string within the ESW; and selecting a winning match from the plurality of matches.

14. The non-transitory CRM of claim 13, wherein calculating the first score comprises:

identifying, within the first plurality of characters, a block of consecutive characters corresponding to a substring of the target string;

setting a match length to the length of the block;

calculating a divisor by summing the size of the ESW and a size of the target string; and calculating a quotient by dividing the match length by the divisor, wherein the first score comprises a scaled version of the quotient.

15. The non-transitory CRM of claim 13, wherein calculating the second score comprises:

identifying, within the second plurality of characters, a plurality of blocks of consecutive characters corresponding to a plurality of substrings of the target string, wherein the plurality of blocks comprises a plurality of lengths;

calculating a match length by summing the plurality of lengths;

calculating a divisor by summing of the size of the ESW and a size of the target string; and calculating a quotient by dividing of the match length by the divisor, wherein the second score comprises a scaled version of the quotient.

16. The non-transitory CRM of claim 13, the instructions further comprising functionality for:

partitioning the target string into a first word and a second word;

calculating, based on the first word, a third score for a third plurality of characters of the extracted string within the ESW;

calculating, based on the second word, a fourth score for a fourth plurality of characters of the extracted string within the ESW;

determining a distance between the third plurality of characters and the fourth plurality of characters within the extracted string;

comparing the distance with a distance threshold; and calculating, in response to the distance being less than the distance threshold, a composite score based on the third score, the fourth score, and the distance.

* * * * *